United States Patent [19]
Brophy et al.

[11] Patent Number: 6,091,969
[45] Date of Patent: Jul. 18, 2000

[54] METHOD AND APPARATUS FOR INBAND SIGNALING CONTROL OF VOCODER BYPASS

[75] Inventors: John Douglas Brophy, Arlington Heights; James Patrick Ashley, Naperville; Lee Michael Proctor, Cary, all of Ill.

[73] Assignee: Motorola, Inc., Schaumburg, Ill.

[21] Appl. No.: 09/138,183

[22] Filed: Aug. 21, 1998

[51] Int. Cl.$^7$ ...................................................... H04Q 7/00

[52] U.S. Cl. .......................... 455/560; 455/422; 455/445; 375/242; 704/221; 704/214; 704/233; 370/522

[58] Field of Search ..................................... 455/560, 403, 455/445, 422, 501, 507, 517, 524, 550; 379/219, 229, 350, 353, 407; 370/287, 374, 378, 384–385, 522; 375/219, 242–243, 254, 277; 704/221, 214, 233

[56] References Cited

U.S. PATENT DOCUMENTS

| | | | |
|---|---|---|---|
| 5,608,779 | 3/1997 | Lev et al. | 455/436 |
| 5,729,536 | 3/1998 | Doshi et al. | 370/328 |
| 5,768,308 | 6/1998 | Pon et al. | 455/445 |
| 5,793,810 | 8/1998 | Han et al. | 455/422 |
| 5,956,673 | 9/1999 | Weaver, Jr. et al. | 704/221 |

*Primary Examiner*—Doris H. To
*Attorney, Agent, or Firm*—Kenneth A. Haas; Sayed Hossain Beladi

[57] ABSTRACT

Vocoder bypass is provided using in-band signaling. In preferred embodiments of the present invention, three signaling channels are arranged for transmission within the compressed speech. Each of the signaling channels are communicated at a preferred rate to permit fast, reliable detection of conditions indicating vocoder bypass mode of operation, to negotiate suitable vocoder type if necessary, and to synchronize and communicate compressed speech in a vocoder bypass mode of operation.

30 Claims, 5 Drawing Sheets

METHOD AND APPARATUS FOR INBAND SIGNALING CONTROL OF VOCODER BYPASS

FIELD OF THE INVENTION

The present invention relates generally to digital communication systems including a vocoder, and more particularly, to a method and apparatus for inband signaling control of vocoder bypass operation.

BACKGROUND OF THE INVENTION

Digital communication systems, and particularly, digital cellular and personal communication system (TCS) systems, include vocoding. Vocoding is the operation of digitally coding speech for transmission. For example, in digital cellular applications both the mobile, i.e., the cellular telephone, and the cellular infrastructure, i.e., the ground based equipment providing service to the mobile, each include a vocoder. In a typical cellular system, the vocoding permits substantial compression of the speech information to be transmitted and is particularly useful for increasing capacity of the cellular system.

In a mobile-to-mobile call, there is double stage speech encoding/decoding (or "tandem vocoding") unless some scheme is provided to bypass vocoder operation in the cellular infrastructure. This is explained as follows. In the mobile-to-mobile call, the mobile transmitting on the uplink uses its vocoder to encode the uplink speech. The cellular infrastructure automatically decodes the uplink speech, which is necessary if the speech is to be transmitted to a land line telephone (i.e., to the public switched telephone network), to an analog portion of the cellular communication system, or to a similar non-digital portion of the communication system. However, where the speech is to be transmitted to a mobile having digital capability, the speech must be re-encoded for digital transmission to the mobile. Tandem vocoding results in a significant reduction in perceived voice quality as compared to single stage vocoding (i.e., mobile-to-land line or land line-to-mobile calls). The voice quality degradation may be overcome if the decoding/encoding step is avoided in the cellular infrastructure. In a bypass mode of operation, the cellular infrastructure receives the compressed speech from the transmitting mobile and transmits it directly, without decoding/encoding, to the receiving mobile. The receiving mobile then decodes the speech as normal. But, without some indication that the vocoder operation should be bypassed in the cellular infrastructure, tandem vocoding takes place. Because of the significant effect that tandem vocoding has on voice quality, cellular system operators insist on having a bypass mode of operation.

In code division multiple access (CDMA) systems, the current standard IS-634 (MSC BSS A+Interface) has provisions for out-of-band control of vocoder bypass. The standard defines messages that the mobile switching center (MSC) can send to the base station controller (BSC) to enable or disable vocoder bypass. However, out-of-band control of vocoder bypass operation has numerous disadvantages including substantial delay in establishing bypass operation and increased traffic on the control channels.

In-band vocoder bypass signaling has been proposed to overcome the numerous disadvantages of out-of-band signaling, but the proposed in-band techniques offer little advantage over the out-of-band techniques. For example, the standard proposed by ETSI for Global System for Mobile Communications (GSM) "Tandem Free Operation" (i.e., vocoder bypass), is an in-band control approach to vocoder bypass operation. The standard specifies a set of in-band signaling messages to be sent between two BSC's for control of vocoder bypass. A single in-band channel for vocoder bypass signaling is allocated in the 64 kbps PCM compressed speech time slot. Specifically, the two least significant bits (LSBs) are allocated, i.e., stolen, for this channel. The bottom LSB, bit 0, is stolen at 8000/16=500 bps continuously. Another proposal calls for stealing at 8 kilobits/second (kbps) bursts. After establishing a bypass circuit, speech frames are sent in bit 1 and bit 0. The signaling information is not sent during bypass operation. This requires that the initial "TREQ" message requesting bypass operation must be explicitly acknowledged by a "TACK" signaling message before coded speech may be sent, i.e., bypass operation undertaken. The result is a complicated multi-state protocol with many timers and counters to track message sequencing. Furthermore, "special case" logic is required throughout to handle the fact that one BSC may advance to the next state before the other BSC. For example, in the BSC associated with sending the TREQ message is a timer to limit the number of times the TREQ message is sent, a timer to time out waiting to receive the TACK message, and logic to handle receiving the next state's message, TACK, prior to receiving the TREQ. The number and complexity of states in the proposed protocol cause transition times to be proportionally lengthy. The complexity also leads to difficulty monitoring and troubleshooting subsystem operation.

As mentioned, the proposed protocols have substantial transition times from tandem vocoding to vocoder bypass mode of operation. For example, using a 500 bps continuous signaling control channel, transition time at a minimum may be as long as 240 milliseconds (ms). If negotiation of vocoder type is required, the transition time is even longer. Using an 8 kbps burst signaling control channel, a worst case transition time may be on the order of 1.5 seconds or more. And again, vocoder negotiation, if necessary, is not included in this estimated transition time.

Thus, there is a need for an improved method and apparatus for in-band signaling control of vocoder bypass.

DETAILED DESCRIPTION OF THE PREFERRED EMBODIMENTS

Vocoder bypass is provided using in-band signaling. In preferred embodiments of the present invention, three signaling channels are arranged for transmission within the compressed speech. Each of the signaling channels are communicated at a preferred rate to permit fast, reliable detection of conditions indicating vocoder bypass mode of operation, to negotiate suitable vocoder type if necessary, and to synchronize and communicate compressed speech in a vocoder bypass mode of operation.

Figure 1:
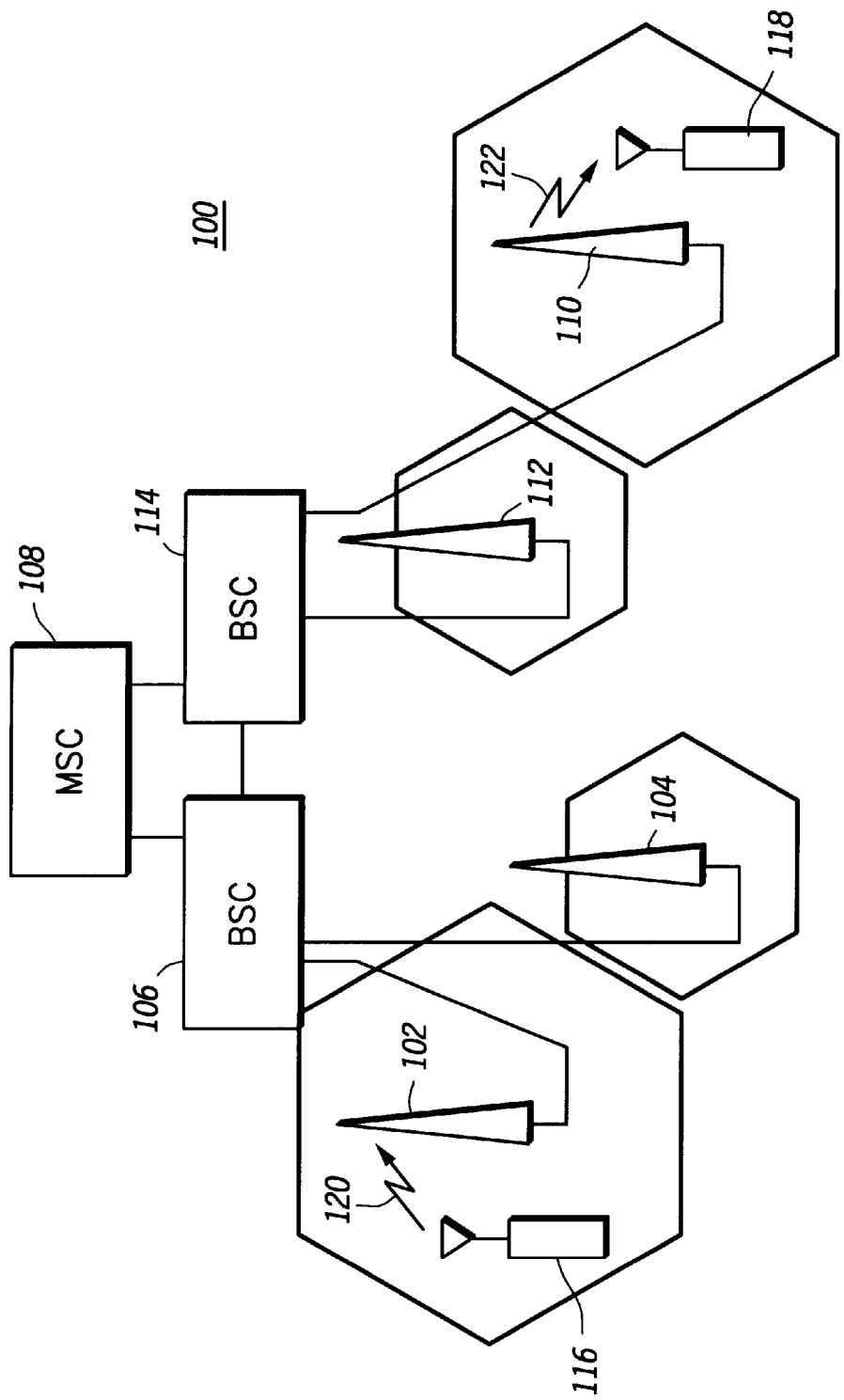
FIG. 1 is a block diagram of a wireless communication system operable in accordance with the preferred embodiments of the present invention.

With reference to FIG. 1 of the drawings, a communication system 100 preferably operates in accordance with a Code Division Multiple Access (CDMA) system protocol (e.g., IS-95-A). It will be appreciated that communication system 100 may alternatively or additionally operate in accordance with other analog, digital or dual-mode communication system protocols such as, but not limited to, the Narrowband Advanced Mobile Phone System (NAMPS), the Advanced Mobile Phone System (AMPS), the Global System for Mobile Communications (GSM), the Personal Digital Communications (PDC), or the United States Digital Cellular (USDC) protocols.

Communication system 100 includes a base transceiver station (BTS) 102 and a BTS 104 with associated coverage areas suitably coupled to a base station controller (BSC) 106. Communication system 100 further includes additional base transceiver stations such as BTS 110 and BTS 112 with associated coverage areas suitably coupled to a base station controller, BSC 114. Each of BSC 106 and BSC 114 are coupled to mobile switching center (MSC) 108 as is well known in the art and are also be coupled to each other. In a preferred embodiment of the present invention each BTS 102, 104, 110 and 112 is preferably a Motorola SC9600 base station system, MSC 108 is preferably a Motorola EMX2500 MSC, and each BSC 106 and 114 is preferably a Motorola SG1128BF CBSC component.

A mobile station (mobile) 116 operating in the coverage area of BTS 102 transmits compressed speech in an uplink signal 120 to BTS 102 and hence to BSC 106. The termination for the call is a mobile 118 operating in the coverage area of BTS 112 associated with BSC 114. Mobile 118 receives a compressed speech downlink signal 122 from BTS 112. Each mobile 116 and 118 is preferably a mobile radiotelephone such as a cellular radiotelephone or a personal communication system (PCS) handset. BSC 106 includes a speech coder/decoder (vocoder) which, absent vocoder bypass mode of operation, operates on uplink signal 120 to decompress/decode the speech for further transmission to elements within communication system 100, and namely, to BSC 114. BSC 114 then operates on the decompressed speech to compress/code the speech for transmission as downlink signal 122. Providing each of mobile 116 and mobile 118 have compatible vocoders, the decoding/coding process is unnecessary resulting in inefficient use of network resources and significant degradation of voice quality.

Figure 2:
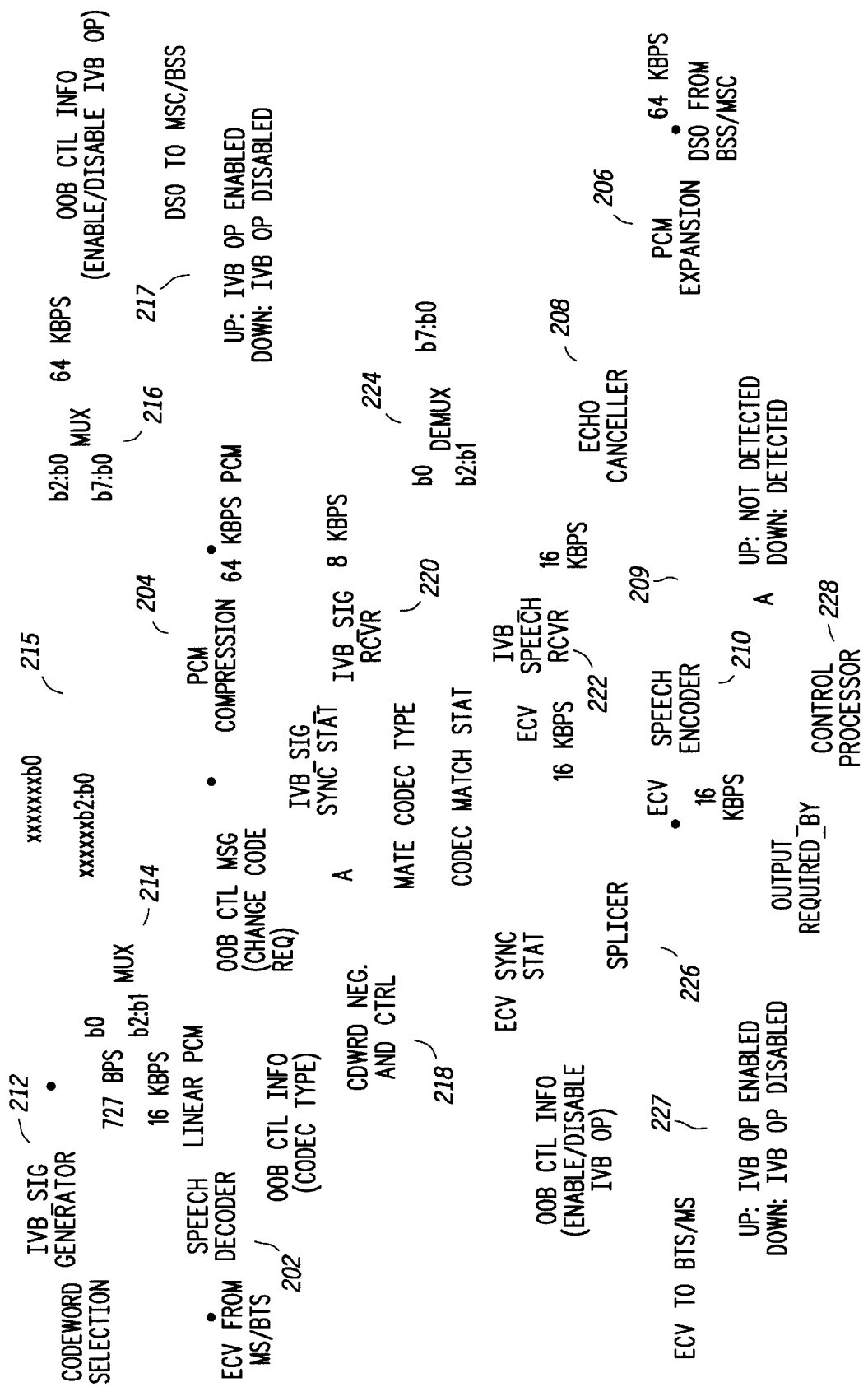
FIG. 2 is a block diagram of an apparatus for vocoder bypass in accordance with a preferred embodiment of the present invention.

In accordance with a preferred embodiment of the present invention, an apparatus and method for vocoder bypass provides in-band signaling for establishing a vocoder bypass mode of operation, i.e., a vocoder bypass circuit. With reference to FIG. 2, a vocoder 200 in accordance with a preferred embodiment of the present invention is shown. Certain elements of vocoder 200 are common and well known in the art and include speech decoder 202, PCM compressor 204, PCM expander 206, echo canceller 208 and speech encoder 210. In a mode of operation without vocoder bypass, these elements function in the normally intended manner to perform coding and decoding of speech. More particularly, and with continued reference to FIG. 2, in the uplink or in a forward direction, coded speech (ECV) is received from a mobile/BTS and is decoded by speech decoder 202. The resulting stream of linear pulse code modulated (PCM) speech is then compressed to 64 kilobits/sec (kbps) PCM speech by PCM compressor 204. The 64 kbps PCM speech is then communicated to the MSC or other system elements such as another BSC in the network. In the downlink or in a reverse direction, 64 kbps PCM speech is received from the MSC or other system elements and expanded to linear PCM by PCM expander 206. The linear PCM is then operated on by echo canceller 208 and is then coded by speech encoder 210. The coded speech is then communicated to the downlink BTS and to the mobile.

As previously noted, in the mobile-to-mobile call context it is desirable to bypass the decoding/coding operations to at least preserve voice quality. In accordance with a preferred embodiment of the present invention, three bi-directional communication channels are defined for in-band vocoder bypass (IVB) signaling and control. The first is referred to herein as the IVB_SIG channel and is used to communicate control signaling, provide bypass circuit type identification, vocoder type identification, and speech frame timing reference. The second is referred to herein as the IVB_SIG_BURST sub-channel and is used to communicate information needed for vocoder type negotiation and for other similar purposes. The third is referred to herein as the IVB_SPEECH channel and is used to carry coded speech frames in the vocoder bypass mode of operation.

The IVB_SIG channel is implemented in the compressed speech by bit stealing bit 0, b0, from the 64 kbps PCM speech time slot. Referring to Table I below, bits b7-b0 of this time slot contain PCM speech sample bits p7-p0, respectively. The IVB_SIG channel steals the bit 0, b0, every 11th sample (i.e., every 11th frame), and replaces it with an IVB_SIG bit, s0.

TABLE I

| IVB_SIG Channel Bit (s0) Allocation | | | | | | | |
|---|---|---|---|---|---|---|---|
| b7 | b6 | b5 | b4 | b3 | b2 | b1 | b0 |
| p7 | p6 | p5 | p4 | p3 | p2 | p1 | p0/s0 |

The IVB_SIG_BURST channel is like a sub-channel of the IVB_SIG channel in that it is only used during certain states of operation arrived at during communication over the IVB_SIG channel. Referring to Table II below, the IVB_SIG_BURST sub-channel is sent as a short 8 kbps burst over bit 1, b1, of the 64 kbps PCM speech time slot.

TABLE II

| IVB_SIG_BURST Sub-channel Bit (s1) Allocation | | | | | | | |
|---|---|---|---|---|---|---|---|
| b7 | b6 | b5 | b4 | b3 | b2 | b1 | b0 |
| p7 | p6 | p5 | p4 | p3 | p2 | p1/s1 | p0/s0 |

During vocoder bypass mode of operation, the IVB_SPEECH channel is carried in bit 1 and bit 2, b1 and b2, of the 64 kbps PCM speech time slot by overwriting the PCM speech bits p1 and p2, as illustrated in Table III below. As seen in Table III, during vocoder bypass mode of operation, bit 0, contains the IVB_SIG bit, s0, bit 2 and bit 1 contain the IVB_SPEECH channel, and bit 7-bit 3 contain the most significant bits (MSBs) of the compressed 64 kbps PCM speech sample, p7-p3, respectively.

TABLE III

IVB_SPEECH Channel Bits (d1:d0) Allocation

| b7 | b6 | b5 | b4 | b3 | b2 | b1 | b0 |
|----|----|----|----|----|----|----|----|
| p7 | p6 | p5 | p4 | p3 | d1 | d0 | p0/s0 |

TABLE IV

IVB_SIG Codeword Examples

| Codeword Name | Codeword Meaning |
|---|---|
| ANN_IVB (8k-qcelp) | announces IVB circuit, and indicates current vocoder type is 8k qcelp |
| ANN_IVB (13k-qcelp) | announces IVB circuit, and indicates current vocoder type is 13k qcelp |
| ANN_IVB (evrc) | announces IVB circuit, and indicates current vocoder type is evrc |
| ANN_IVB (reserved) | announces IVB circuit, and indicates current vocoder type is (reserved) |

In providing three signaling channels, as will be explained, the unexpected result of reduced system complexity and reduced transition time is obtained. Furthermore, each of the signaling channel protocols are arranged to reduce impact on voice quality during setup of vocoder bypass mode of operation, to provide fast establishment of vocoder bypass mode of operation and to further provide fast recovery from and transition back to tandem vocoder operation.

Vocoder bypass operating mode is enabled by an out-of-band system control message. Enabling vocoder bypass operating mode initializes the IVB_SIG channel, which is then always transmitted as a "beacon" for in-band detection of a mobile-to-mobile circuit and to provide a speech frame timing reference. The IVB_SIG_BURST sub-channel is only transmitted as short bursts during vocoder type negotiation and for similar signaling requirements. In accordance with preferred embodiments of the present invention, the IVB_SIG_BURST sub-channel may be limited to time intervals where it will be least disruptive to the ongoing speech activity. For example, depending on the system and its operation, insertions during high speech activity, for example full-rate speech transmission in IS-95, may be the least noticeable. In other system types it may be desirable to place the IVB_SIG_BURST interruptions during times corresponding to low speech activity or comfort noise insertion. In either case, selection of appropriate times for the transmission of the IVB_SIG_BURST channel may be based upon determining a time resulting in the least disruption to the ongoing speech activity. The IVB_SPEECH channel is only transmitted during vocoder bypass mode of operation. As will be discussed, vocoder bypass operating mode may require negotiation of compatible vocoder types, which may be accomplished using either or both of the IVB_SIG and the IVB_SIG_BURST channels.

Data sent in the IVB_SIG channel is one of a plurality of long codewords. Long codewords are transmitted on the IVB_SIG channel to reliably synchronize the IVB_SIG channel to the receiver. A preferred codeword set allows for corruption of up to a ceiling function ($N_{cb}/6$), where $N_{cb}$ is the number of codeword bits and providing the spacing of the bit corruption is a multiple of 6. In this manner, the IVB_SIG channel is robust as to noise or bit corruption. One source of bit corruption lies with existing T1 bit stealing by other network communications, e.g., the landline network. In the preferred embodiment discussed herein, $N_{cb}$=29 and is relatively immune to errors introduced by such known T1 bit stealing. Table IV provides examples of preferred codewords by name and associated meaning. Of course, it is well within the skill of one having ordinary skill in the art to adopt a suitable hex value for each codeword given a number of available codeword bits.

In operation, a receiving BSC detects and decodes the IVB_SIG long codewords using an IVB_SIG channel receiver discussed more fully below with respect to FIG. 2 and FIG. 3. The transmitting BSC must generate and format the IVB_SIG codewords and the IVB_SIG channel. An IVB state machine, discussed below with-respect to FIG. 4, FIG. 5 and FIG. 6, controls the transition into and out of vocoder bypass operation.

With reference again to FIG. 2, vocoder 200 includes in addition to the previously described elements an IVB_SIG channel generator 212, a multiplexer 214, a multiplexer 216, a codeword negotiator and control 218, an IVB_SIG channel receiver 220, an IVB_SPEECH receiver 222, a demultiplexer 224 and a splicer 226. Also provided are switch 217 and switch 227 which are responsive to the out-of-band IVB enable message to enable bypass vocoder operation. More particularly, switch 217 couples IVB_SIG generator 212 into the uplink circuit and its output is multiplexed with the compressed speech by multiplexer 216. The output of multiplexer 216 at this point is the IVB_SIG channel signal in bit 0, b0, of the compressed speech with bits 7-1 containing compressed speech. IVB_SIG generator 212 is responsive to a codeword selection signal from codeword negotiator and control 218 to generate the correct codeword. In the bypass mode of operation, switch 215 is responsive to a signal from codeword negotiator and control 218 indicating matching codewords, i.e., the vocoders are the same type, to couple the output of multiplexer 214 to multiplexer 216. Multiplexer 214 combines the IVB_SPEECH channel, bit 2 and bit 1, b2 and b1, and the IVB_SIG channel in bit 0, b0 into the three LSBs. The three LSBs are then combined by multiplexer 216 with bit 7-bit 3, b7-b3, of the compressed speech, and encoded speech from the mobile is transmitted in the uplink bypassing normal vocoder operation.

As discussed above, up to 3 least significant bits (LSBs) of the PCM samples may be overwritten to contain the IVB_SIG channel, the IVB_SIG_BURST channel and the IVB_SPEECH channel. With IVB enabled, the IVB_SIG channel is always present with bit 0, b0, of the PCM speech overwritten with the IVB_SIG bit, s0, at the rate of $8000/N_s$, or 727 bits per second (bps) bit stealing with $N_s$=11. The value $N_s$=11 is preferred and is selected to ensure proper error correction, although it will be appreciated that other suitable values of Ns may be selected without departing from the fair scope of the present invention. Until bypass mode of operation is actually initiated, bit 1 and bit 2 of the 64 kbps PCM speech time slot still contain PCM speech. During vocoder bypass operation, bits 1 and 2 are overwritten with encoded compressed speech bits at a rate of 16 kbps (every sample), in addition to the bit stealing of bit 0, b0, done by the IVB_SIG channel. As noted, IVB_SIG channel is initialized by an out-of-band control message, and IVB_SPEECH is initialized based upon a "CODEC MATCH STAT" signal. The CODEC MATCH STAT signal is generated on the downlink side in response to successfully detecting the IVB_SIG channel long codeword and determining that the vocoders for each of the mobiles match.

Figure 6:
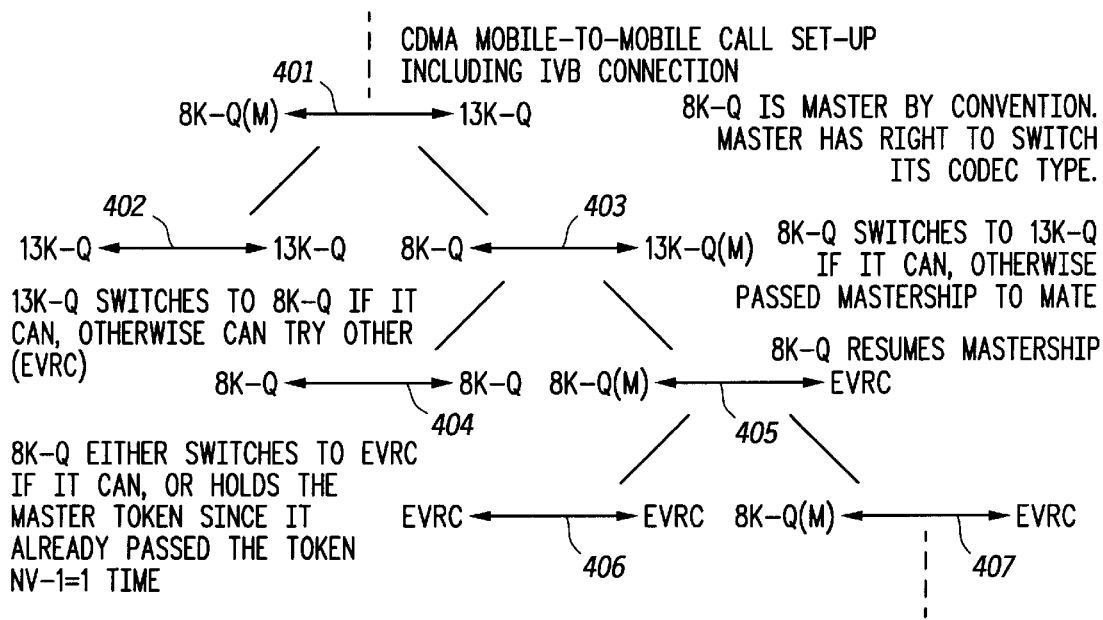
FIG. 6 is a diagram illustrating an exemplary vocoder type negotiation.

In the downlink, with IVB enabled, demultiplexer 224, IVB_SPEECH_RCVR 222 and splicer 226 are coupled into the downlink circuit. With continued reference to FIG. 2, the 64 kbps PCM compressed speech is input to demultiplexer 224 that outputs an 8 kbps stream (bit 0, b0) and a 16 kbps stream (bit 1 and bit 2, b1 and b2) for subsequent processing. IVB_SIG receiver 220 searches for the start of the sub-rate 727 bps codeword within the 8 kbps stream, syncs to it, and decodes the codeword for input to codeword negotiator and control 218. Codeword negotiator and control 218 compares the received codeword, and hence the vocoder type identified by the codeword, and generates the CODEC MATCH STAT signal. If the received vocoder type does not match, a vocoder negotiation, discussed more fully below with respect to FIG. 6, is initiated.

Figure 3:
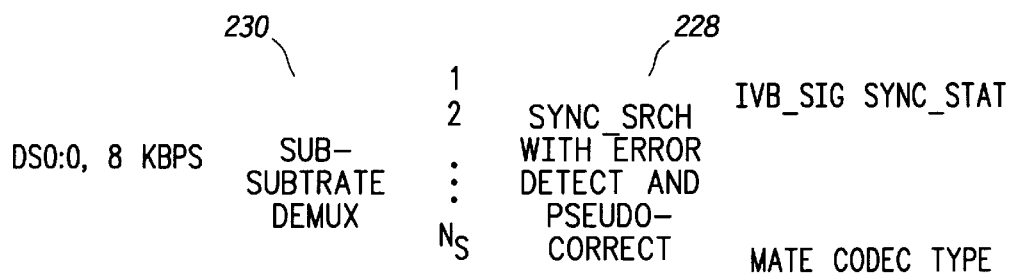
FIG. 3 is a block diagram further illustrating a signaling receiver in accordance with a preferred embodiment of the present invention.

Referring to FIG. 3, IVB_SIG channel receiver 220 includes a sub-subrate demultiplexer 228 and a synchronization searcher 230, which may include error detection and pseudo-correction. The 8 kbps subrate stream (bit 0 of the compressed speech) is fed into sub subrate demultiplexer 228 which breaks out $N_s$ ($N_s$=11), 8000/$N_s$=727 bps streams, any one of which may contain the IVB_SIG channel. Every channel is searched for the presence of one of the $N_{cw}$=3 codewords, with up to $N_{cb}$/6 bit errors spaced at multiples of 6 times the first ignored (for example, caused by telephone network T1 bit stealing and thus providing pseudo-correction). The outputs are a control signal indicating whether the codeword has been found (IVB_SIG_SYNC_STAT) and the vocoder type identified by the codeword which is communicated to codeword negotiator and control 218.

Switch 209 is responsive to detection of the IVB_SIG SYNC STAT control signal for uncoupling echo canceller 208 from the downlink circuit and for directly coupling the downlink expanded PCM speech to the speech encoder. IVB_SPEECH RCVR 222, upon receipt of the CODEC MATCH STAT signal, sends 16 kbps encoded speech to splicer 226 and a coded speech (ECV) SYNC STAT signal. Splicer 226 is responsive to the coded speech SYNC STAT to provided synchronized coded speech, either from IVB_SPEECH_RCVR 222 or speech encoder 210, in the downlink to the BTS.

Splicer 226 provides for a seamless transition from/to encoded PCM frames to/from bypass coded frames by coordinating the timing of the switch over from one circuit to the other circuit, e.g., PCM to bypass. The effect of the splicer is to eliminate audible switching artifacts such as audio holes, clicks and other distortions. The OUTPUT_REQUIRED_BY timing signal is provided by a control processor 228 to each of splicer 226 and speech encoder 210, and is the start signal. Splicer 226 actually acts as a distributed function part of which executes prior to speech encoder 210 and is thus able to block the output from speech encoder 210 and switch in IVB_SPCH_RCVR 222 output. The timing is such that speech encoder 210 has just completed sending the previous coded speech frame and has not started to output the current coded speech frame. The bypass coded speech frame is thus switched in seamlessly. It should be noted that the bypass coded speech frames are transmitted with minimal delay in part to facilitate the buffering required in IVB_SPCH_RCVR 222 and splicer 226 for splicer 226 to function.

As will be appreciated, the present invention provides for continuously sending the compressed 64 kbps PCM speech in the bits not occupied by the IVB channels. It further provides for normal speech processing of the speech data. This reduces response time of the various filters upon reverting back to vocoder normal operation. Also, always sending the compressed 64 kbps PCM speech minimizes the impact on voice quality should the bypass circuit output inadvertently be passed through the speech encoder on the receiving side, i.e., bits p7-p3 will otherwise contain compressed speech data.

Splicer 226 also guards against transitions from full rate to eighth rate frames when transitioning from encoded speech output to bypass coded speech output, and vice versa. This is accomplished by waiting until a non-full rate frame was sent on the previous frame, frame n-1, before switching to the new mode, i.e., vocoder bypass mode of operation to normal mode of operation or normal mode of operation to vocoder bypass mode of operation, for sending the current frame, frame n. If frame n-1 sent in mode x (bypass or normal) was full rate, then frame n will not be sent in mode y (the alternate to bypass or normal), except in the following case. A counter for the number of continuous full rate frames sent in mode x while trying to transition from mode y is initialized and incremented for each full rate frame. If this count exceeds a threshold, for example a threshold of 10, then the switch to the new mode is made and the current frame available in the new mode is sent and the new mode is entered.

Figure 4:
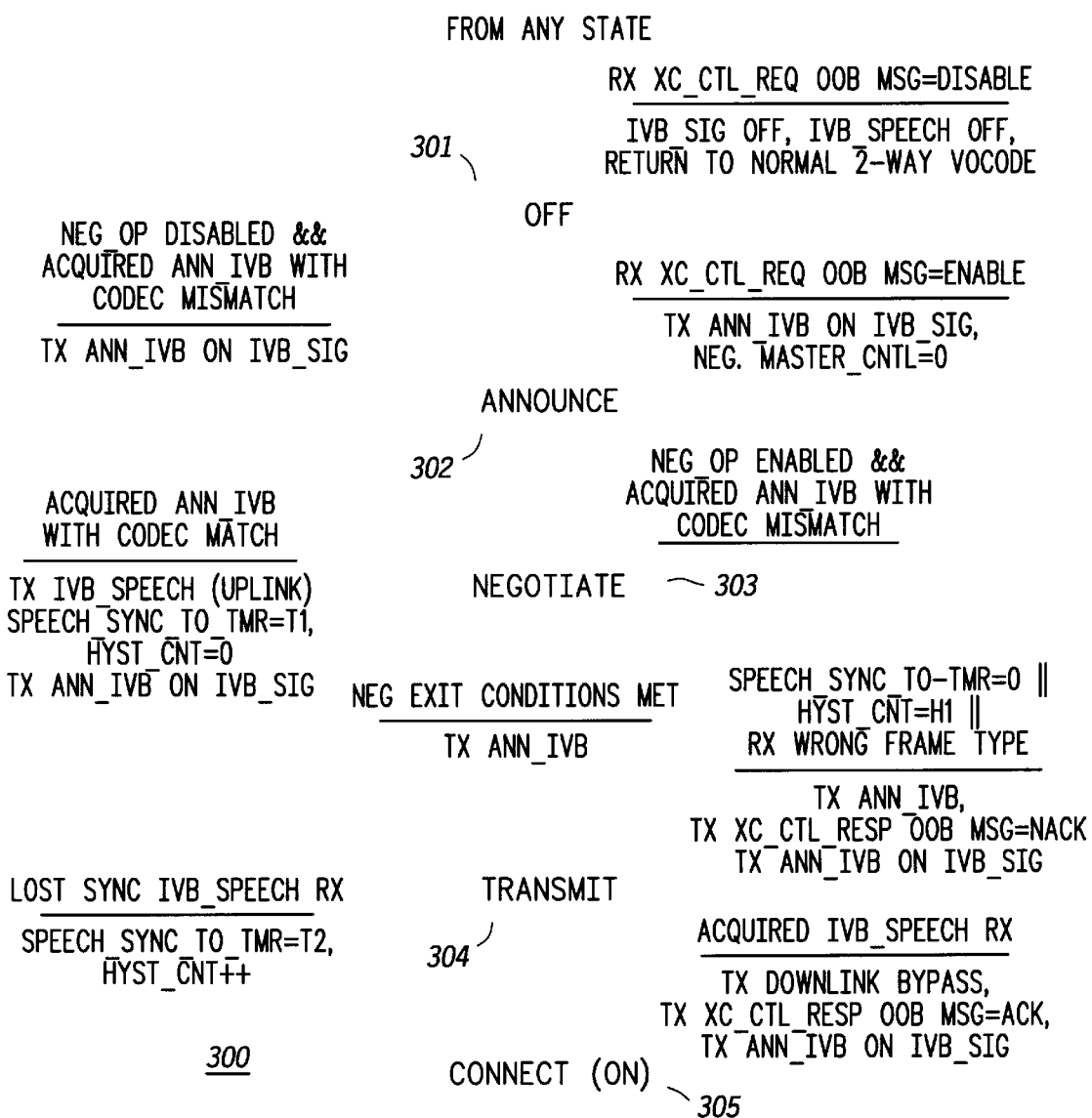
FIG. 4 is a state transition diagram illustrating a method of vocoder bypass in accordance with a preferred embodiment of the present invention.
Figure 5:
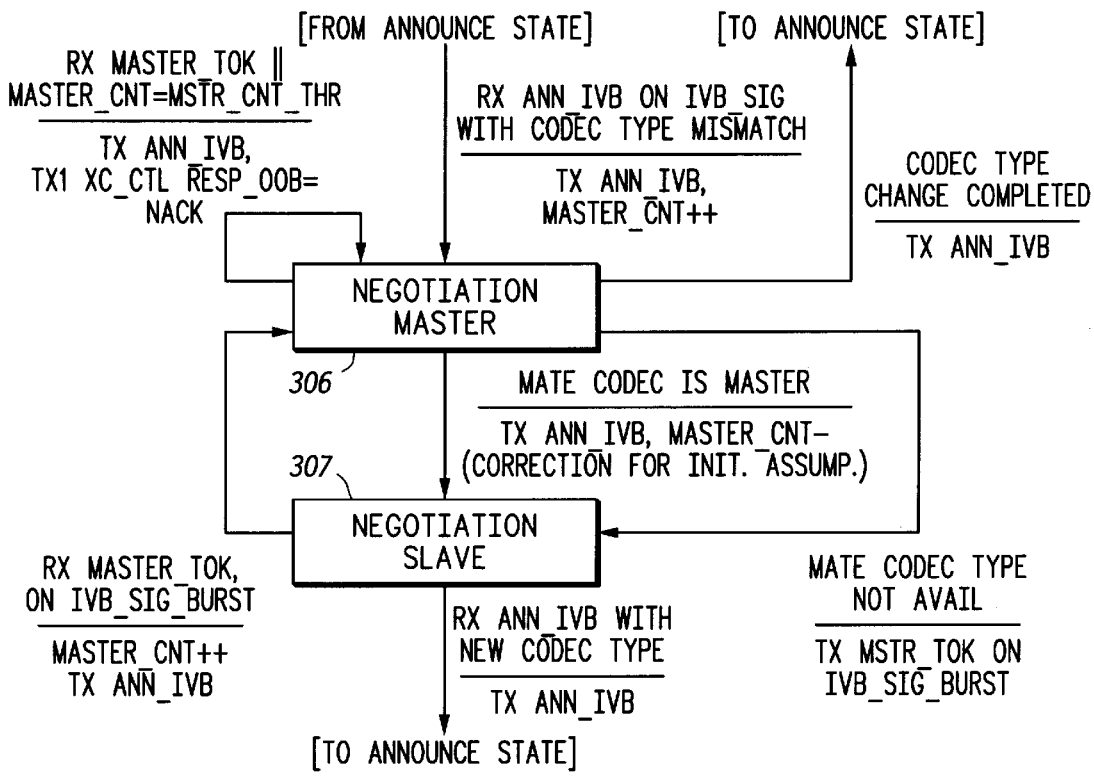
FIG. 5 is state transition diagram illustrating an additional aspect of the method of vocoder bypass illustrated in FIG. 4.

With reference now to FIG. 4–FIG. 6 operation of vocoder 200 is described in view of the illustrated state diagrams 300, 400 and 500. In accordance with a preferred method of establishing vocoder bypass operating mode, initially IVB is not enabled and the method remains in the OFF state 301. OFF state 301 is entered based upon an out-of-band IVB disable signal and/or upon initialization of communication system 100. In OFF state 301, the IVB_SIG channel is not active, and likewise, the IVB_SIG_BURST and the IVB_SPEECH channels are inactive. Upon receipt of an out-of-band system control message from the MSC, indicating IVB enable, vocoder 200 enters the ANNOUNCE state 302.

In ANNOUNCE state 302, an "ANN_IVB" codeword for the current codex type is transmitted (uplink) on the IVB_SIG channel with the IVB_SIG channel being configured for overwriting the LSB of the 64 kbps PCM speech samples every 11 timeslots as discussed. The timing of the IVB_SIG channel is aligned with the uplink encoded speech, but could be aligned with the downlink encoded speech timing. Also in ANNOUNCE state 302, the ANN_IVB codeword which should be sent by the mate BSC, e.g., BSC 114, is searched for. When the received ANN_IVB codeword is found, if it is the same codeword, i.e., the vocoders match, then the ANNOUNCE state is exited. A timer, speech_sync_TO_tmr, to search for sync to coded speech is is initialized to a default value of about 40 ms. A timer to guard against rapidly going into bypass, Hyst_Cnt, is reset to 0. And, the TRANSMIT state 304 is entered.

In TRANSMIT state 304, coded speech frames are sent in the IVB_SPEECH channel at 16 kbps in bits, b2 and b1, as described. The start of the coded speech frame sent is aligned to the uplink coded speech from the mobile, but it could be aligned with the start of the received ANN_IVB codeword to optimize synchronization and timing at the mate BSC. The speech_sync_TO_tmr is started (countdown), and the downlink 64 kbps PCM speech bits b2 and b1 are monitored for the start of coded speech frames, which are expected to be time aligned with transmitted ANN_IVB codeword. In the preferred embodiment, the ANN_IVB codeword is continuously sent on the IVB_SIG channel during TRANSMIT state 304. If the speech_sync_ TO_tmr expires (reaches zero), ANNOUNCE state 302 is re-entered. If speech sync is acquired before speech_sync_ TO_tmr expires, then the TRANSMIT state is exited. A message is sent to the upper system layers (e.g., to the MSC) indicating bypass sync. The downlink bypass function is started, and the CONNECT state 305 is entered.

In CONNECT state 305, bypass operation in both directions is continued, and the ANN_IVB codeword is continuously sent on the IVB_SIG channel. If receive (rx) speech sync is lost, the speech_sync_TO_tmr is set to T2 and Hyst_Cnt is incremented before re-entering TRANSMIT state 304. If the received IVB_SIG channel is lost, indicating a mismatched vocoder, or if the coded speech frame type changes, then CONNECT state 305 is exited and ANNOUNCE 302 state is re-entered.

Should the vocoders not match, i.e., the ANN_IVB codewords for each BSC do not match, a NEGOTIATE state 303 is entered. Vocoder negotiation may also be disabled by setting the NEG_OP to disable. If vocoder negotiation is disabled and if the ANN_IVB codewords do not match, the BSC continues in ANNOUNCE state 302 and transmission of ANN_IVB on the IVB_SIG channel continues. The ANN_IVB codeword is also sent and searched for at all times during NEGOTIATE state 303.

With reference to FIG. 5, NEGOTIATE state 303 includes two sub-states the NEGOTIATION MASTER substate 306 and the NEGOTIATION SLAVE substate 307. NEGOTIATION MASTER substate 306 is the default upon entering NEGOTIATION state 303. The NEGOTIATION SLAVE substate 307 is entered from NEGOTIATION MASTER substate 306 if the mate vocoder, i.e., the vocoder of the BSC with which the negotiations are occurring, has negotiation master rights based upon a pre-agreed convention. NEGOTIATION MASTER substate 306 is entered from NEGOTIATION SLAVE substate 307 of a MASTER_TOKEN (MSTR_TOK) burst message received on the IVB_SIG_ BURST sub-channel while in NEGOTIATION SLAVE substate 307. A possible convention 400 for defining default vocoder negotiation mastership is illustrated in FIG. 6. Table V illustrates one potential hierarchy of vocoder types, it being understood that virtually any convention for assigning mastership may be used without departing from the fair scope of the present invention. Using Table V and information regarding each vocoder type a master is determined. According to a preferred embodiment of the invention, only the master may change vocoder types although it will be appreciated other conventions may be applied.

TABLE V

Example Hierarchy for Vocoder Negotiation 8 kbps QCELP
13 kbps QCELP
EVRC (8 kbps)

Referring to FIG. 5, FIG. 6 and Table V, at 401, the "8 k-Q" vocoder is the master by convention. Accordingly, it has the right to change vocoder types, and if it can change to "13 k-Q" it does so, 402, otherwise it passes mastership. At 403, mastership has passed to the 13 k_Q vocoder which is now master. If it is possible, it changes its type to 8 k-Q, 404, if not, it will try EVRC and pass mastership, 405. With mastership returned, the 8 k-Q vocoder may then change types to EVRC if possible, 406. Otherwise, it retains mastership, 407, as the master token has been passed Nv-2=1 time indicating that there are no additional vocoders available, Nv=the number of possible vocoder types. Additionally, a master may at anytime elect not to pass mastership if, for example, there are no other vocoder types available. At this point of the negotiation matching vocoder types are not available. As shown in FIG. 5, after each vocoder type change, ANNOUNCE state 302 is re-entered to permit detection and matching of the respective ANN_ IVB codewords on the IVB_SIG channel. In this manner signaling messages containing vocoder type information, available vocoder type information and the like are advantageously avoided during the vocoder negotiation.

Codeword negotiator and control 218 participates in the negotiation by receiving out-of-band messages indicating the current vocoder type. Additionally, when a vocoder type change is required, codeword negotiator and control 218 requests the out-of-band control message required to generate a vocoder change. Also, upon a change in vocoder type, codeword negotiator and control 218 sends to IVB_ SIG generator 212 the update current codeword information in order to update the long codeword being sent in the IVB_SIG channel.

In summary, and in accordance with the above-described preferred embodiment of the present invention, a single codeword is sent continuously to announce the presence of a mobile-to-mobile connection. The codeword advantageously functions as both a synchronization pattern and a message conveying vocoder type information. Received codewords are not explicitly acknowledged by sending back an acknowledge codeword. Instead, acknowledgment is done by sending bypass data (coded speech) in a separate IVB_SPEECH subrate channel if the vocoders are found to match or not sending bypass data if the vocoders do not match. The result is substantially reduced transition times and ease of maintenance. The IVB_SIG signaling channel is transmitted at all times that IVB operation is enabled using an out-of-band control signal message. This eliminates the need for explicit acknowledgment of messages.

The IVB_SIG channel is sub-rate multiplexed into the LSB (bit 0, b0) for transmission within the 64 kbps PCM speech regardless of transmission, span, type (T1 or E1). The receiving end of the signaling circuit detects and ignores bit errors caused by T1 bit stealing. The set of messages, or codewords, one for each vocoder type, is designed to allow for these bit errors. The bit error detection and pseudo-correction (bit errors spaced 6 apart are ignored) are transparent to E1 operation, and thus eliminates the need to configure the IVB_SIG channel for span type.

The IVB_SPEECH channel is subrate multiplexed into the LSBs (bit 2 and bit 1, b2 and b1) for transmission within the 64 kbps PCM speech also regardless of span type. The IVB_SPEECH channel is only active, with IVB enabled, after the IVB_SIG channel codeword indicates matching vocoder types. Otherwise, PCM speech bits are transmitted in bits b7-b1. PCM speech bits are always transmitted in bits b7-b3 regardless of vocoder bypass mode of operation.

For vocoder type negotiation in the case of initial vocoder mismatch, the invention defines a master vocoder based on a standard convention (current vocoder types). Only the master may change its local vocoder type. Mastership can be passed to the mate via a message in the IVB_SIG_BURST channel. Excessive message transmission is avoided by not sending available/alternate vocoder information type. This is permitted by the fast detection of matching vocoder types using the IVB_SIG channel and thus allowing a change and detect method of operation.

It is anticipated that transition from tandem vocoder operation to vocoder bypass mode of operation for matching vocoder types may be accomplished as fast as 100 ms. For negotiated vocoder types, it is anticipated that the transition may be made in between about 200–300 ms.

Figure 7:
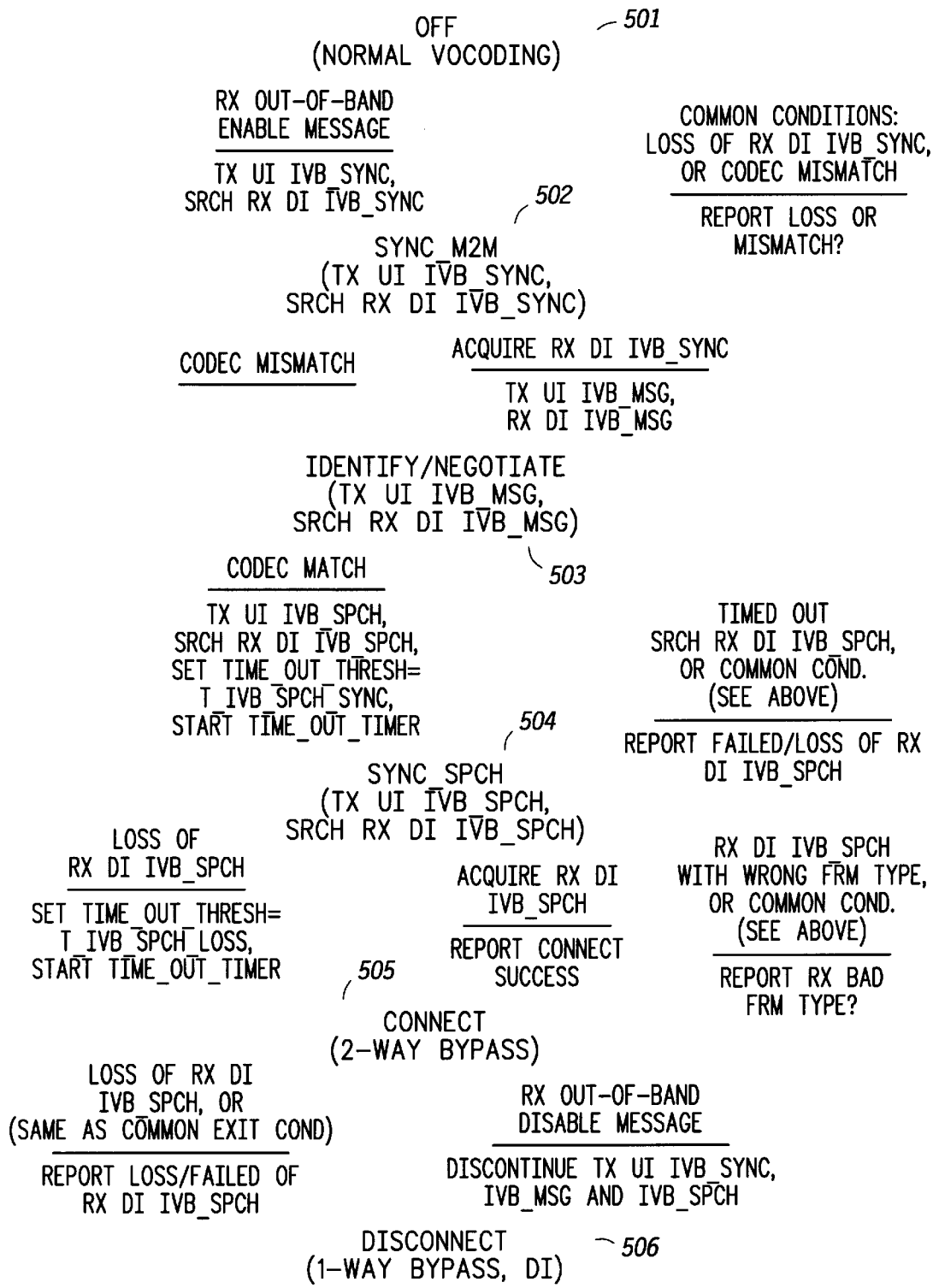
FIG. 7 is a state transition diagram illustrating a method of vocoder bypass in accordance with an alternate preferred embodiment of the present invention.

Referring now to FIG. 7, in accordance with an alternate preferred embodiment of the present invention, three signaling channels are again provided for identifying and controlling vocoder bypass mode of operation. Two features of the alternate embodiment are reduced complexity, and associated reduced processing overhead, of the initial search for synchronization signaling, and enhanced compatibility with other call processing features, for example, echo cancellers.

A first of the signaling channels, IVB_SYNC, is used to identify a mobile-to-mobile communication and that the mobiles are equipped to handle vocoder bypass. The IVB_SYNC channel, with IVB enabled, continuously sends a single, repeating bit pattern in bit 0, b0, of the 64 kbps PCM speech time slot at 727 bps (i.e., 1:11 bit stealing). The bit pattern is chosen sufficiently long to be immune to bit errors and corruption, but also short enough to provide quick detection. A 29 or 30 bit pattern is presently preferred, although it will be appreciated other bit pattern lengths may be used without departing from the fair scope of the present invention. Unlike IVB_SIG, IVB_SYNC does not contain vocoder type information. Therefore, it has a much lower initial detection overhead. It also is reliable and works well over T1 and E1 circuits. As will be further described, the IVB_SYNC channel is also used in demultiplexing a second of the signaling channels, the IVB_MSG channel.

The IVB_MSG channel is used to convey the vocoder type information. The IVB_MSG channel is also sent using bit stealing at a preferred rate of 727 bps, (1:11 bit stealing). Two alternatives exists for implementing IVB_MSG, and depend on the impact the bit stealing has on voice quality. A first implementation provides for stealing bit 3, b3, of the 64 kbps PCM speech time slot at 727 bps. Providing that stealing bit 3 at this rate does not adversely impact voice quality, this implementation provides for three unique channels in the 64 kbps PCM speech. To further reduce the impact on overall sound quality, e.g., both during high speech activity and during quiet periods, the IVB_MSG channel may be coordinated to periods of high speech activity or low speech activity depending on the system. For example, it may be desirable to coordinate the IVB_MSG channel to be sent during period of low speech activity in order to reduce audible impact on the PCM speech. However, if generated noise due to the bit stealing is excessive and/or overly objectionable, it is possible to coordinate the IVB_MSG channel with periods of high speech activity where the impact on voice quality may not be objectionable, due to the "masking effect."

Unlike the IVB_SYNC channel, IVB_MSG is not sent continuously. At the appropriate times, as will be described, the IVB_MSG channel is generated and sent in order to provide vocoder type identification and for use in negotiating changes in vocoder type. Therefore, in the second implementation of the IVB_MSG channel it shares bit 1, b1, with the third channel, IVB_SPEECH. The IVB_SPEECH channel is implemented as described above and steals bits at a 16 kbps rate in bit 2 and bit 1, b2 and b1, of the 64 kbps PCM speech time slot. By providing sharing of bit 1, b1, between the IVB_MSG channel and the IVB_SPEECH channel, any impact on the PCM speech, and/or on the quiet periods of low speech activity is virtually eliminated.

A particularly preferred implementation of IVB_MSG utilizes the bit 1, b1, while IVB operation is established and then moves to bit 3, b3, during vocoder bypass mode of operation. As will be appreciated, before vocoder bypass mode of operation is established, encoded speech is not present in the IVB_SPEECH channel. Thus, bit 1, b1, is available for the IVB_MSG channel. Once vocoder bypass mode of operation is established, there is minimal if any impact on voice quality resulting from stealing bit 3, b3, since encoded speech is now being sent in the bypass mode in bit 1 and bit 2, b1 and b2.

With reference then to FIG. 7, initially IVB is not enabled represented by the OFF state 501. OFF state 501 is entered based upon an out-of-band IVB disable signal and/or upon initialization of communication system 100. In OFF state 501, there is no IVB information transmitted in the uplink 64 kbps PCM speech nor searched/tracked in the downlink 64 kbps PCM speech. In OFF state, normal vocoder operation occurs.

When enabled, the SYNC_M2M (synchronize mobile-to-mobile circuit) state 502 is entered. In SYNC_M2M state 502, an IBV_SYNC transmitter (similar to IVB_SIG generator 202 shown in FIG. 2) sends an IVB_SYNC codeword starting exactly every 40 ms, i.e., starting every 320th PCM sample) and thus in exact synchronization with the start of every other decoded speech frame of PCM samples. This is done to facilitate the detection and demultiplexing of the IVB_MSG channel at an IVB sync receiver (similar to IVB_RCVR 220). The IV_MSG channel is sent in synchronization with the IVB_SYNC channel. The IVB_SYNC codeword is inverted to indicate to the receiver that IVB_MSG channel bits are present during the corresponding time interval. The IVB_SYNC codeword bits can be inverted on a half codeword basis. For example, with $N_{cb}=29$, the first 15 codeword bits may be inverted and the remaining 14 codeword bits left as is. Alternatively, the first 15 codeword bits may be left as is and the remaining 14 codeword bits inverted. This allows the IVB_MSG channel to be active on a 20 ms basis. The receiver searches for the various codeword inversions which may represent: 1) no bits inverted—IVB_MSG channel not present, 2) first 15 bits inverted—IVB_MSG channel present in first 20 ms interval, 3) second 14 bits inverted—IVB_MSG channel present in second 20 ms interval and 4) all 29 bits inverted—2 consecutive IVB_MSG channels present. Furthermore, the IVB_SYNC channel receiver adjusts its timing every 40 ms to account for the non-integer denominator relationship of the bit steal interval (11) to the codeword period (320).

When a non-inverted IVB_SYNC pattern is detected, SYNC_M2M state is exited and the IDENTIFY/NEGOTIATE state 503 is entered. In IDENTIFY/NEGOTIATE state 503, vocoder information is communicated in the IVB_MSG channel. IDENTIFY/NEGOTIATE state 503 is maintained until matching vocoder type information is received on the IVB_MSG channel. Optionally, the IVB_MSG channel may be used to negotiate vocoder type in the case of originally mismatched vocoder types. The negotiation may be a procedure as described above, or vocoder type information may be provided on the IVB_MSG channel to provide an "implied rule database" solution. When matching vocoder type information is received, the SYNC_SPCH state 504 is entered.

In SYNC_SPCH state 504, coded speech is sent in the IVB_SPEECH channel. Coded speech is also searched for in the downlink PCM speech. The IVB_SYNC and IVB_MSG channels are still observed in the event a vocoder type change is required and/or bypass mode of operation must be disabled. While in SYNC_SPCH state 504, the vocoder continues to execute and supplies decoded speech output to the uplink PCM speech and encoded PCM speech to the downlink.

When synchronization to coded speech is obtained, the CONNECT state 505 is entered. In CONNECT state 505, the IVB circuit is completed and bypass coded speech is communicated between the mobiles. The vocoder continues to run in parallel to vocoder bypass to support seemless switching back to bypass disabled (normal vocoding) mode. CONNECT state 505 is maintained until either sync to bypass coded speech is lost, an out-of-band disable command is received, the IVB_SYNC channel is lost, non-matching vocoder type information is received on the IVB_MSG channel or coded speech frames not compatible with the current vocoder are received.

From CONNECT state 505, and upon receipt of a disable command, the DISCONNECT state 506 is entered. In DISCONNECT state 506, all uplink IVB transmit processing is discontinued and normal vocoding is restored. Downlink bypass of coded speech received is still supported. This 1-way, "half-duplex" mode of operation is maintained until there is a loss of sync to downlink coded speech or any other IVB receive loss condition occurs.

As will be appreciated, the three inband signaling channels of the present invention are reconfigured in an alternate preferred embodiment to provide lower detection overhead while still providing the advantages of fast transition to vocoder bypass mode of operation. It should be further appreciated that modification of vocoder 200 to perform in accordance with the above-described alternate preferred embodiment is easily accomplished.

Many additional changes and modifications could be made to the invention without departing from the fair scope and spirit thereof. The scope of some changes is discussed above. The scope of others will become apparent from the appended claims.

We claim:

1. In a wireless communication system providing communication services between a first mobile and a second mobile, the first mobile having a first mobile vocoder, the second mobile having a second mobile vocoder and the wireless communication system having a vocoder active mode of operation and a vocoder bypass mode of operation, a method of transitioning the wireless communication system from vocoder active mode of operation to the vocoder bypass mode of operation, the method comprising the steps of:

providing a first signal within a compressed speech signal, the first signal including a vocoder bypass capability information and a vocoder type information;

detecting the first signal the compressed speech signal;

determining a compatibility of the first mobile vocoder and the second mobile vocoder based at least upon the vocoder type information;

determining an incompatibility between the first mobile vocoder and the second mobile vocoder;

negotiating a compatible vocoder type; and initiating the vocoder bypass mode of operation based upon the compatibility.

2. The method of claim 1, comprising the step of continuing to provide the first signal within the uplink compressed speech signal during the vocoder bypass mode of operation.

3. The method of claim 2, wherein the first signal is transmitted on a channel within the compressed speech that is also used for at least one other network communication.

4. The method of claim 1, the first signal containing synchronization information.

5. The method of claim 1, the vocoder bypass mode of operation further comprising providing encoded speech information within the compressed speech channel and at a subrate thereof.

6. The method of claim 1, wherein the vocoder type information comprises a second signal within the compressed speech signal, the second signal including the vocoder type information.

7. The method of claim 6, further comprising inverting at least a portion of the first signal to provide an inverted portion and synchronizing the second signal to the inverted portion.

8. The method of claim 7, the inverted portion being transmitted in synchronization with at least one decoded speech frame contained within the speech channel.

9. The method of claim 1, wherein the vocoder type information comprises a first mobile vocoder type and a second mobile vocoder type, and the step of determining a compatibility comprises comparing the first mobile vocoder type with the second mobile vocoder type.

10. The method of claim 1, wherein the step of negotiating comprises:

selecting one of the first mobile vocoder and the second mobile vocoder as a master; and having the master initiate a change in vocoder type.

11. A method of controlling vocoder operation within a wireless communication system comprising:

providing a signaling channel within a speech channel synchronized too and at a subrate thereof, the signaling channel at least providing synchronization information;

providing vocoder information within the speech channel and at a subrate thereof, the vocoder information being synchronized to the signaling channel;

detecting a vocoder compatibility and incompatibility;

negotiating a compatible vocoder type; and upon determining the vocoder compatibility, providing an encoded speech channel within the speech channel and at a subrate thereof.

12. The method of claim 11, the step of providing vocoder information within the speech channel comprising, configuring the signaling channel to send vocoder type information.

13. The method of claim 11, the step of providing vocoder information within the speech channel comprising, providing a message channel within the speech channel and at a subrate thereof.

14. The method of claim 13, the step of providing vocoder information comprising inverting a portion of the synchronization information to provide an inverted portion, and synchronizing the vocoder type information to the inverted portion.

15. The method of claim 14, inverted portion being transmitted in synchronization with at least one decoded speech frame contained within the speech channel.

16. In a wireless communication system, the wireless communication system having a vocoder mode of operation and a vocoder bypass mode of operation, a method for inband signaling control of the vocoder bypass mode of operation, the method comprising the steps of:

in the vocoder active mode of operation:

receiving a coded first signal from a mobile, decoding the coded first signal to create a decoded first signal and coupling the decoded first signal into a speech channel in a first direction;

receiving a decoded second signal in the speech channel in a second direction, coding the decoded second signal and transmitting the coded second signal to the mobile;

generating a first bypass signal and embedding the first bypass signal into the speech channel in the first direction and generating a second bypass signal and embedding the second bypass signal into the speech channel in the second direction;

upon detecting both the first bypass signal and the second bypass signal in the speech channel, determining a vocoder compatibility; and upon determining the vocoder compatibility entering the second mode of operation;

in the second mode of operation:

receiving the coded first signal from the mobile and coupling the coded first signal into the speech channel in the first direction; and receiving a coded second signal in the speech channel in the second direction and transmitting the coded second signal to the mobile;

wherein each of the first bypass signal and the second bypass signal contain synchronization information;

further comprising in the second mode of operation the steps of providing a first vocoder type information signal in the speech channel in the first direction and providing a second vocoder type information signal in the speech channel in the second direction, the first vocoder type information and the second vocoder type information being synchronized to the synchronization information.

17. The method of claim 16, the first bypass signal containing first vocoder type information, the second bypass signal containing second vocoder type information, and the step of determining a vocoder compatibility comprising comparing the first vocoder type information and the second vocoder type information.

18. The method of claim 16, further comprising in the second mode of operation the steps of providing a first vocoder type information signal in the speech channel in the first direction and providing a second vocoder type information signal in the speech channel in the second direction, and the step of determining a vocoder compatibility comprising comparing the first vocoder type information and the second vocoder type information.

19. The method of claim 18, wherein the step of providing a first vocoder type information in the speech channel comprises inserting a burst signal in the speech channel.

20. The method of claim 19, wherein each of the first bypass signal and the second bypass signal contain synchronization information and the step of inserting a burst signal comprises detecting an inversion of at least a portion of the synchronization information.

21. The method of claim 20, wherein the inversion is synchronized to decode speech information within the speech channel.

22. The method of claim 16, the synchronization information comprising an inverted portion of at least one of the first bypass signal and the second bypass signal.

23. The method of claim 16, wherein in the second mode of operation: the method further comprising:

generating the first bypass signal and embedding the first bypass signal into the speech channel in the first direction and generating the second bypass signal and embedding the second bypass signal into the speech channel in the second direction.

24. The method of claim 16, comprising concomitantly generating the first bypass signal and embedding the first bypass signal into the speech channel in the first direction and generating the second bypass signal and embedding the second bypass signal into the speech channel in the second direction.

25. In a communication system, a method for providing in-band signaling comprising the steps of:

inserting a first signal in a communication channel;

inverting a portion of the first signal to signal a presence of a second signal within the communication channel; and detecting the second signal.

26. The method of claim 25, inverted portion and the second signal being substantially simultaneous.

27. The method of claim 25, the inverted portion and the second signal being substantially simultaneous with decoded information contained within the communication channel.

28. The method of claim 25, further comprising prior to inverting the portion of the first signal, determining a need to send the second signal.

29. The method of claim 25, the first signal comprising vocoder bypass capability information and the second signal comprising vocoder type information.

30. The method of claim 29, the second signal further comprising alternate vocoder type information.

* * * * *